United States Patent
Li et al.

(10) Patent No.: US 11,385,830 B2
(45) Date of Patent: Jul. 12, 2022

(54) DATA STORAGE METHOD, APPARATUS AND SYSTEM, AND SERVER, CONTROL NODE AND MEDIUM

(71) Applicants: Beijing Kingsoft Cloud Network Technology Co., Ltd., Beijing (CN); Beijing Kingsoft Cloud Technology Co., Ltd., Beijing (CN)

(72) Inventors: Jian Li, Beijing (CN); Wenshu Wang, Beijing (CN)

(73) Assignees: Beijing Kingsoft Cloud Network Technology Co., Ltd., Beijing (CN); Beijing Kingsoft Cloud Technology Co., Ltd., Beijing (CN)

( * ) Notice: Subject to any disclaimer, the term of this patent is extended or adjusted under 35 U.S.C. 154(b) by 0 days.

(21) Appl. No.: 17/281,466

(22) PCT Filed: Sep. 26, 2019

(86) PCT No.: PCT/CN2019/108186
§ 371 (c)(1),
(2) Date: Mar. 30, 2021

(87) PCT Pub. No.: WO2020/063763
PCT Pub. Date: Apr. 2, 2020

(65) Prior Publication Data
US 2022/0004334 A1 Jan. 6, 2022

(30) Foreign Application Priority Data
Sep. 30, 2018 (CN) .......................... 201811159536.2

(51) Int. Cl.
G06F 12/00 (2006.01)
G06F 3/06 (2006.01)
G06F 13/00 (2006.01)
G06F 13/28 (2006.01)

(52) U.S. Cl.
CPC .......... G06F 3/0655 (2013.01); G06F 3/0604 (2013.01); G06F 3/067 (2013.01)

(58) Field of Classification Search
CPC ....... G06F 3/0655; G06F 3/0604; G06F 3/067
See application file for complete search history.

(56) References Cited

U.S. PATENT DOCUMENTS 9,442,671 B1 * 9/2016 Zhang ................. H04L 67/1076
2014/0317308 A1 10/2014 Zhang et al.
(Continued)

FOREIGN PATENT DOCUMENTS

| CN | 102467570 A | 5/2012 |
|----|-------------|--------|
| CN | 102841931 A | 12/2012 |

(Continued)

OTHER PUBLICATIONS

International Search Report dated Dec. 27, 2019, issued in connection with International Application No. PCT/CN2019/108186, filed on Sep. 26, 2019, 6 pages.
(Continued)

Primary Examiner — Mark A Giardino, Jr.
(74) Attorney, Agent, or Firm — McDonnell Boehnen Hulbert & Berghoff LLP

(57) ABSTRACT

In one example, a method includes: receiving a ready-to-split instruction for the to-be-split fragment; sending the ready-to-split instruction to slave servers, so that each of the slave servers obtains data splitting points of the to-be-split fragment, and sends the data splitting points to the master server; when the number of received data splitting points exceeds a first threshold number, sending data splitting points to the control node, so that the control node sends a splitting-storage instruction to the master server; sending the splitting-storage instruction to each of the slave servers, so that each of the slave servers performs splitting-storage on
(Continued)

the to-be-split fragment according to the data splitting points, and sends a first message to the master server to indicate completion of the splitting-storage; when the number of received first messages exceeds a second threshold number, performing splitting-storage on the to-be-split fragment according to the data splitting points.

12 Claims, 3 Drawing Sheets

(56) References Cited

U.S. PATENT DOCUMENTS

| | | | |
|---|---|---|---|
| 2014/0330785 | A1 | 11/2014 | Isherwood et al. |
| 2015/0169621 | A1 | 6/2015 | Ouyang |

FOREIGN PATENT DOCUMENTS

| | | | |
|---|---|---|---|
| CN | 103078927 | A | 5/2013 |
| CN | 105379293 | A | 3/2016 |
| CN | 105930498 | A | 9/2016 |
| CN | 106453665 | A | 2/2017 |
| CN | 106843745 | A | 6/2017 |
| CN | 107169009 | A | 9/2017 |
| CN | 108052622 | A | 5/2018 |
| CN | 108572793 | A | 9/2018 |
| CN | 109284073 | A | 1/2019 |

OTHER PUBLICATIONS

Written Opinion dated Dec. 27, 2019, issued in connection with International Application No. PCT/CN2019/108186, filed on Sep. 26, 2019, 4 pages.

* cited by examiner

DATA STORAGE METHOD, APPARATUS AND SYSTEM, AND SERVER, CONTROL NODE AND MEDIUM

CROSS-REFERENCE TO RELATED APPLICATIONS

The present application is a U.S. National Phase Application under 35 U.S.C. § 371 of International Application No. PCT/CN2019/108186 filed Sep. 26, 2019, which claims priority to Chinese patent application No. 201811159536.2, filed with the China National Intellectual Property Administration on Sep. 30, 2018 and entitled "DATA STORAGE METHOD, APPARATUS AND SYSTEM, AND SERVER, CONTROL NODE AND MEDIUM", which are incorporated herein by reference in their entirety.

TECHNICAL FIELD

The application relates to the field of data storage technologies, in particular to a data storage method, apparatus, system, server, control node and medium.

BACKGROUND

With the rapid development of information technology, the data volume of a data storage system is increasingly large. In order to meet the requirement of large data volumes, distributed storage systems operating on multiple servers have been widely used. A distributed storage system stores data in fragments for increased storage volume, and can be expanded when equipped with more fragments. Storage volume of the distributed storage system is hereby increased.

Each of fragments has a respective data storage range. As a result, once data is to be stored, the data storage range for the data is to be determined first, such that the fragment for the to-be-stored data can be determined. The data storage range and fragment for the to-be-stored data may be directly determined, or determined through a consistent hash algorithm.

To ensure high available data and services, the distributed storage system is typically provided with a fault tolerance mechanism to make redundant backups for fragments. The same fragment may be stored on different servers so as to avoid data loss and storage service failure when a server becomes unavailable. The same fragment may correspond to a master server and one or more slave servers. On the other hand, a server may act as the master server for a fragment and a slave server for another fragment.

In practical applications, a fragment in the distributed storage system may not be able to provide sufficient service capacity if data volume increases and pressure due to more requests for the fragments grows. In this case, the data in a fragment is to be stored in multiple sub-fragments created for the fragment. A specific data storage method may be as follow. A control node in the distributed storage system determines a target fragment that is to be split for storage; changes the state of the target fragment from writable to non-writable; splits the data in the target fragment to obtain multiple data slices; determines servers to store the data slices; sends splitting instructions to the determined servers. The determined servers create sub-fragments for the target fragment, and determine data storage ranges for the sub-fragments. The data slices are then stored into the sub-fragments according to data storage ranges thereof.

In a case where a target fragment is stored on multiple servers, the above method will be executed once for each copy of the target fragment. In order to ensure the consistency of the data stored in sub-fragments of the same target fragment in different servers, the state of the target fragment is set to a non-writable state. As a result, data writing into the target fragment is denied during the above data storage process. The availability of the distributed storage system is thus reduced.

SUMMARY

The present application provides a data storage method, apparatus, system, server, control node and medium for improving availability of a storage system. The specific technical solutions are as follows.

In a first aspect, the embodiment of the present application provides a data storage method applicable to a master server for a to-be-split fragment, comprising:

receiving, from a control node, a ready-to-split instruction for the to-be-split fragment;

sending the ready-to-split instruction to slave servers for the to-be-split fragment, so that after receiving the ready-to-split instruction, each of the slave servers obtains data splitting points of the to-be-split fragment, and sends the data splitting points to the master server;

when the number of received data splitting points exceeds a first threshold number, sending data splitting points to the control node, so that the control node sends a splitting-storage instruction to the master server;

after receiving the splitting-storage instruction, sending the splitting-storage instruction to each of the slave servers, so that each of the slave servers performs splitting-storage on the to-be-split fragment according to the data splitting points to obtain target fragments, and sends, after obtaining the target fragments, a first message to the master server to indicate completion of the splitting-storage; and when the number of received first messages exceeds a second threshold number, performing splitting-storage on the to-be-split fragment according to the data splitting points to obtain target fragments.

Optionally, after performing splitting-storage on the to-be-split fragment according to the data splitting points to obtain target fragments when the number of received first messages exceeds a second threshold number, the method further comprises:

sending a first message to the control node, so that the control node determines, after receiving the first message, data storage ranges of the target fragments and a target data storage range based on the data splitting points and a data storage range of the to-be-split fragment before the splitting-storage; and updating a pre-recorded data storage range of the to-be-split fragment to the target data storage range, and recording correspondence between target fragments and data storage ranges determined for the target fragments, wherein, the target data storage range is a data storage range of the to-be-split fragment after the splitting-storage.

Optionally, when data stored in the target fragments is the same as the data stored in the to-be-split fragment, the method further comprises:

obtaining correspondence between all fragments and data storage ranges; and based on the obtained correspondence, determining whether any fragment on the master server stores data outside the data storage range of the fragment; if so, deleting the data outside the data storage range of the fragment.

Optionally, the method further comprises:

obtaining a data storage request for the to-be-split fragment, wherein the data storage request comprises to-be-stored data;

in a case that no splitting-storage instruction is received, sending the data storage request to the slave servers, so that each of the slave servers stores the to-be-stored data to the to-be-split fragment, and sends a second message to the master server; wherein, the second message indicates completion of data storage; and storing, when the number of received second messages exceeds the second threshold number, the to-be-stored data to the to-be-split fragment; and in a case that a splitting-storage instruction is received, determining whether a first message has been sent to the control node; if the first message has been sent, sending the data storage request to the slave servers, so that each of the slave servers determines a fragment to store the to-be-stored data from the target fragments and the to-be-split fragment after the splitting-storage, stores the to-be-stored data to the fragment determined, and send a second message to the master server; determining, when the number of received second messages exceeds the second threshold number, a fragment to store the to-be-stored data from the target fragments and the to-be-split fragment after the splitting-storage, and storing the to-be-stored data to the fragment determined; if no first message has been sent, after sending the first message to the control node, performing the step of sending the data storage request to the slave servers.

In a second aspect, the embodiment of the present application provides a data storage method applicable to a control node, comprising:

sending a ready-to-split instruction for a to-be-split fragment to a master server for the to-be-split fragment, so that the master server sends the ready-to-split instruction to slave servers for the to-be-split fragment after receiving the ready-to-split instruction, and sends, when receiving data splitting points more than a first threshold number, the data splitting points to the control node; and when receiving the data splitting points, sending a splitting-storage instruction to the master server, so that the master server sends the splitting-storage instruction to each of the slave servers after receiving the splitting-storage instruction, and performs, when receiving first messages more than a second threshold number, performing splitting-storage on the to-be-split fragment according to the data splitting points to obtain target fragments.

Optionally, after the step of sending a splitting-storage instruction to the master server when receiving the data splitting points, the method further comprises:

after receiving the first message sent by the master server, determining data storage ranges of the target fragments and a target data storage range according to the data splitting points and a data storage range of the to-be-split fragment before the splitting-storage; and updating a pre-recorded data storage range of the to-be-split fragment to the target data storage range, and recording correspondence between target fragments and data storage range determined for the target fragments, wherein the target data storage range is a data storage range of the to-be-split fragment after the splitting-storage.

Optionally, the method further comprises:

sending, to servers, a gather instruction for data storage ranges of all fragments, so that after receiving the gather instruction, each of servers obtains data storage ranges of all fragments stored thereon, and sends obtained data storage ranges to the control node; wherein, the servers include the master server and the slave servers;

after receiving data storage ranges sent by the servers, determining, for each fragment, whether a pre-recorded state of the fragment is an in-splitting-storage state;

if pre-recorded state of the fragment is the in-splitting-storage state, determining whether a pre-recorded data storage range of the fragment is the same as the obtained data storage range of the fragment;

if the pre-recorded data storage range of the fragment is the same as the obtained data storage range, sending a splitting-storage instruction to the master server for the fragment; and if the pre-recorded data storage range of the fragment is not the same as the obtained data storage range, changing the pre-recorded state of the fragment to a splitting-storage completed state.

In a third aspect, the embodiment of the present application provides a data storage apparatus applicable to a master server a to-be-split fragment, comprising:

a receiving module, configured for receiving, from a control node, a ready-to-split instruction for the to-be-split fragment;

a first sending module, configured for sending the ready-to-split instruction to slave servers for the to-be-split fragment, so that after receiving the ready-to-split instruction, each of the slave servers obtains data splitting points of the to-be-split fragment; and sends the data splitting points to the master server;

a second sending module, configured for sending, when the number of received data splitting points exceeds a first threshold number, data splitting points to the control node, so that the control node sends a splitting-storage instruction to the master server;

a third sending module, configured for sending, after receiving the splitting-storage instruction, the splitting-storage instruction to each of the slave servers, so that each of the slave servers performs splitting-storage on the to-be-split fragment according to the data splitting points to obtain target fragments, and sends, after obtaining the target fragments, a first message to the master server to indicate completion of the splitting-storage; and a splitting module, configured for performing, when the number of received first messages exceeds a second threshold number, performing splitting-storage on the to-be-split fragment according to the data splitting points to obtain target fragments.

Optionally, the apparatus further comprises:

a forth sending module, configured for sending a first message to the control node, so that the control node determines, after receiving the first message, data storage ranges of the target fragments and a target data storage range based on the data splitting points and a data storage range of the to-be-split fragment before the splitting-storage; and updating a pre-recorded data storage range of the to-be-split fragment to the target data storage range, and recording correspondence between target fragments and data storage ranges determined for the target fragments, wherein, the target data storage range is a data storage range of the to-be-split fragment after the splitting-storage.

Optionally, the apparatus further comprises:

a first obtaining module, configured for obtaining correspondence between all fragments and data storage ranges when data stored in the target fragment is the same as data stored in the to-be-slit fragments;

a first determining module, configured for based on the obtained correspondence, determining whether any fragment on the master server stores data outside the data storage range of the fragment; and a deleting module, configured for deleting the data outside the data storage range of the fragment if there is such a fragment.

Optionally, the apparatus further comprises:

a second obtaining module, configured for obtaining a data storage request for the to-be-split fragment, wherein the data storage request comprises to-be-stored data;

a fifth sending module, configured for in a case that no splitting-storage instruction is received, sending the data storage request to the slave servers, so that each of the slave servers stores the to-be-stored data to the to-be-split fragment, and sends a second message to the master server; wherein, the second message indicates completion of data storage;

a first storage module, configured for storing, when the number of received second messages exceeds the second threshold number, the to-be-stored data to the to-be-split fragment;

a second determining module, configured for in a case that a splitting-storage instruction is received, determining whether a first message has been sent to the control node;

a sixth sending module, configured for if the first message has been sent, sending the data storage request to the slave servers, so that each of the slave servers determines a fragment to store the to-be-stored data from the target fragments and the to-be-split fragment after the splitting-storage, stores the to-be-stored data to the fragment determined, and sends a second message to the master server; and a second storage module, configured for determining, when the number of received second messages exceeds the second threshold number, a fragment to store the to-be-stored data from the target fragments and the to-be-split fragment after the splitting-storage, and storing the to-be-stored data to the fragment determined;

the sixth sending module is further configured for, if no first message has been sent, after sending the first message to the control node, performing the step of sending the data storage request to the slave servers.

In a forth aspect, the embodiment of the present application provides a data storage apparatus applicable to a control node, comprising:

a seventh sending module, configured for sending a ready-to-split instruction for a to-be-split fragment to a master server for the to-be-split fragment, so that the master server sends the ready-to-split instruction to slave servers for the to-be-split fragment after receiving the ready-to-split instruction, and sends, when receiving data splitting points more than a first threshold number, the data splitting points to the control node; and an eighth sending module, configured for when receiving the data splitting points, sending a splitting-storage instruction to the master server, so that the master server sends the splitting-storage instruction to each of the slave servers after receiving the splitting-storage instruction, and performs, when receiving first messages more than a second threshold number, performing splitting-storage on the to-be-split fragment according to the data splitting points to obtain target fragments.

Optionally, the apparatus further comprises:

a determining module, configured for after receiving the first message sent by the master server, determining data storage ranges of the target fragments and a target data storage range according to the data splitting points and a data storage range of the to-be-split fragment before the splitting-storage; and a first modifying module, configured for updating a pre-recorded data storage range of the to-be-split fragment to the target data storage range, and recording correspondence between target fragments and data storage ranges determined for the target fragments, wherein the target data storage range is a data storage range of the to-be-split fragment after the splitting-storage.

Optionally, the apparatus further comprises:

a ninth sending module, configured for sending, to servers, a gather instruction for data storage ranges of all fragments, so that after receiving the gather instruction, each of servers obtains data storage ranges of all fragments stored thereon, and sends obtained data storage ranges to the control node; wherein, the servers include the master server and the slave servers;

a third determining module, configured for after receiving data storage ranges sent by the servers, determining, for each fragment, whether a pre-recorded state of the fragment is an in-splitting-storage state;

a forth determining module, configured for if pre-recorded state of the fragment is the in-splitting-storage state, determining whether a pre-recorded data storage range of the fragment is the same as the obtained data storage range of the fragment;

a tenth sending module, configured for if the pre-recorded data storage range of the fragment is the same as the obtained data storage range, sending a splitting-storage instruction to the master server for the fragment;

a second modifying module, configured for if the pre-recorded data storage range of the fragment is not the same as the obtained data storage range, changing the pre-recorded state of the fragment to a splitting-storage completed state.

In a fifth aspect, the embodiment of the present application provides a data storage system, comprising a control node, a master server for a to-be-split fragment, and slave servers for the to-be-split fragment, wherein, the control node is configured for sending a ready-to-split instruction for the to-be-split fragment to the master server;

the master server is configured for sending the ready-to-split instruction to slave servers for the to-be-split fragment after receiving the ready-to-split instruction;

the slave severs are configured for obtains data splitting points of the to-be-split fragment after receiving the ready-to-split instruction, and sending the data splitting points to the master server;

the master server is further configured for sending, when the number of received data splitting points exceeds a first threshold number, data splitting points to the control node;

the control node is further configured for sending a splitting-storage instruction to the master server after receiving the data splitting points from the master server;

the master server is further configured for sending the splitting-storage instruction to each of the slave servers after receiving the splitting-storage instruction;

the slave severs are further configured for performing splitting-storage on the to-be-split fragment according to the data splitting points to obtain target fragments, and sending a first message to the master server to indicate completion of the splitting-storage; and the master server is further configured for performing, when the number of received first messages exceeds a second threshold number, splitting-storage on the to-be-split fragment according to the data splitting points to obtain target fragments.

Optionally, the master server is further configured to send a first message to the control node;

the control node is further configured for, after receiving the first message sent by the master server, determining data storage ranges of the target fragments and a target data storage range according to the data splitting points and a data storage range of the to-be-split fragment before the splitting-storage; and updating a pre-recorded data storage range of the to-be-split fragment to the target data storage range, and recording correspondence between target fragments and data storage range determined for the target fragments, wherein the target data storage range is a data storage range of the to-be-split fragment after the splitting-storage.

Optionally, the master server is further configured for, when data stored in the target fragments is the same as the data stored in the to-be-split fragment, obtaining correspondence between all fragments and data storage ranges; and based on the obtained correspondence, determining whether any fragment on the master server stores data outside the data storage range of the fragment; if so, deleting the data outside the data storage range of the fragment.

Optionally, the master server is further configured for obtaining a data storage request for the to-be-split fragment, wherein the data storage request comprises to-be-stored data; and in a case that no splitting-storage instruction is received, sending the data storage request to the slave servers;

the slave sever is further configured for storing the to-be-stored data to the to-be-split fragment, and sending a second message to the master server; wherein, the second message indicates completion of data storage;

the master server is further configured for storing the to-be-stored data to the to-be-split fragment when the number of the second messages received meets the second number of threshold values;

the master server is further configured for in a case that a splitting-storage instruction is received, determining whether a first message has been sent to the control node; if the first message has been sent, sending the data storage request to the slave servers;

the slave sever is further configured for determining a fragment to store the to-be-stored data from the target fragments and the to-be-split fragment after the splitting-storage, storing the to-be-stored data to the fragment determined, and sending a second message to the master server; and the master server is further configured for determining, when the number of received second messages exceeds the second threshold number, a fragment to store the to-be-stored data from the target fragments and the to-be-split fragment after the splitting-storage, and storing the to-be-stored data to the fragment determined; if no first message has been sent, after sending the first message to the control node, performing the step of sending the data storage request to the slave servers.

Optionally, the slave server is further configured for determining, after receiving the first message, data storage ranges of the target fragments and a target data storage range based on the data splitting points and a data storage range of the to-be-split fragment before the splitting-storage; and updating a pre-recorded data storage range of the to-be-split fragment to the target data storage range, and recording correspondence between target fragments and data storage ranges determined for the target fragments, wherein, the target data storage range is a data storage range of the to-be-split fragment after the splitting-storage.

Optionally, the control node is further configured for sending, to servers, a gather instruction for data storage ranges of all fragments, wherein, the servers include the master server and the slave servers;

the severs are configured for after receiving the gather instruction, obtaining data storage ranges of all fragments stored thereon, and sending obtained data storage ranges to the control node;

the control node is further configured for after receiving data storage ranges sent by the servers, determining, for each fragment, whether a pre-recorded state of the fragment is an in-splitting-storage state; if pre-recorded state of the fragment is the in-splitting-storage state, determining whether a pre-recorded data storage range of the fragment is the same as the obtained data storage range of the fragment; if the pre-recorded data storage range of the fragment is the same as the obtained data storage range, sending a splitting-storage instruction to the master server for the fragment; and if the pre-recorded data storage range of the fragment is not the same as the obtained data storage range, changing the pre-recorded state of the fragment to a splitting-storage completed state.

In a sixth aspect, the embodiment of the present application provides a master server, comprising:

a memory configured for storing a computer program;

a processor configured for implementing the steps of data storage method applied to a master server provided by the embodiment of the present application when executing the computer program stored in the memory.

In a seventh aspect, the embodiment of the present application provides a control node, comprising:

a memory configured for storing computer programs;

a processor configured for implementing the steps of data storage method applied to a control node provided by the embodiment of the present application when executing the computer program stored in the memory.

In an eighth aspect, the present application provides a computer-readable storage medium, having stored thereon a computer program that, upon execution by a processor, causes the processor to perform the method steps of data storage method applicable to a master server provided by the embodiment of the present application.

In a ninth aspect, the present application provides a computer-readable storage medium, having stored thereon a computer program that, upon execution by a processor, causes the processor to perform the steps of data storage method applicable to a control node provided by the embodiment of the present application.

In a tenth aspect, the present application provides a computer program product containing instructions which, when executed on a computer, cause the computer to implement the data storage method applied to a master server.

In an eleventh aspect, the present application provides a computer program product containing instructions which, when executed on a computer, cause the computer to implement the data storage method applied to a control node.

In a twelfth aspect, the present application provides a computer program product which, when executed on a computer, causes the computer to implement the data storage method applied to a master server.

In a thirteenth aspect, the present application provides a computer program product which, when executed on a computer, causes the computer to implement the data storage method applied to a control node.

Data splitting method, system, server, control node, and computer-readable storage medium are provided by the embodiments of the present application. A control node sends a ready-to-split instruction to a master server for a to-be-split fragment. The master server sends the ready-to-split instruction to the slave servers for the to-be-split fragment. The slave servers obtain the data splitting points of the a to-be-split fragment, and send the data splitting points to the master server. The master server sends the data splitting points to the control node when the number of received data splitting points exceeds a first threshold number. After receiving the data splitting points, the control node sends a splitting-storage instruction. The master server and the slave servers perform splitting-storage on the to-be-split fragment. Each of the slave servers performs splitting-storage on the to-be-split fragment according to the data splitting points to obtain target fragments, and sends a first message to the master server. When the number of first messages received by the master server is greater than a second threshold number, splitting-storage is performed on the to-be-split fragment according to the data splitting points to obtain the target fragments. It can be seen that in the technical solution provided by the embodiment of the present application, the slave servers obtain data splitting points of the to-be-split fragment, and sends the data splitting points to the master server, so that the master server and the slave servers can perform splitting-storage on the to-be-split fragment according to the same data splitting points, and thus obtain the same target fragments. During the splitting-storage process, instead of being non-writable as in prior art, the to-be-split fragment is available for read and writing. The availability of the storage system is thus improved.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The present application is further described in detail below with reference to the appended drawings and embodiments, for the purpose of clarifying the objects, technical solutions and advantages of the present application. Obviously, the described embodiments are only some, and not all, of the embodiments of the present application. All other embodiments obtained based on the embodiments of the present application by those skilled in the art without any creative efforts fall into the scope of protection defined by the present application.

The present application provides a data storage method, apparatus, system, server, control node and computer readable medium. The following first describes the data storage method provided by the embodiment of the present application applied to the master server for a to-be-split fragment.

It should be noted that the data storage method provided in the embodiment of the present application is applicable to a master server for a to-be-split fragment. The to-be-split fragment mentioned here is a fragment to be split for storage. The master server is defined with respect to a to-be-split fragment. A master server for a fragment may be a slave server for another fragment. In the embodiment of the present application, the master server for a target fragment may be a server in Kingsoft Table Storage (KTS) system. KTS is a fully managed Not Only SQL (NoSQL) database service that provides storage and real-time access to massive structured and semi-structured data. The master server for a to-be-split fragment can be selected from servers storing target fragments using a Raft algorithm. The Raft algorithm is a consensus algorithm that is easier to understand.

Figure 1:
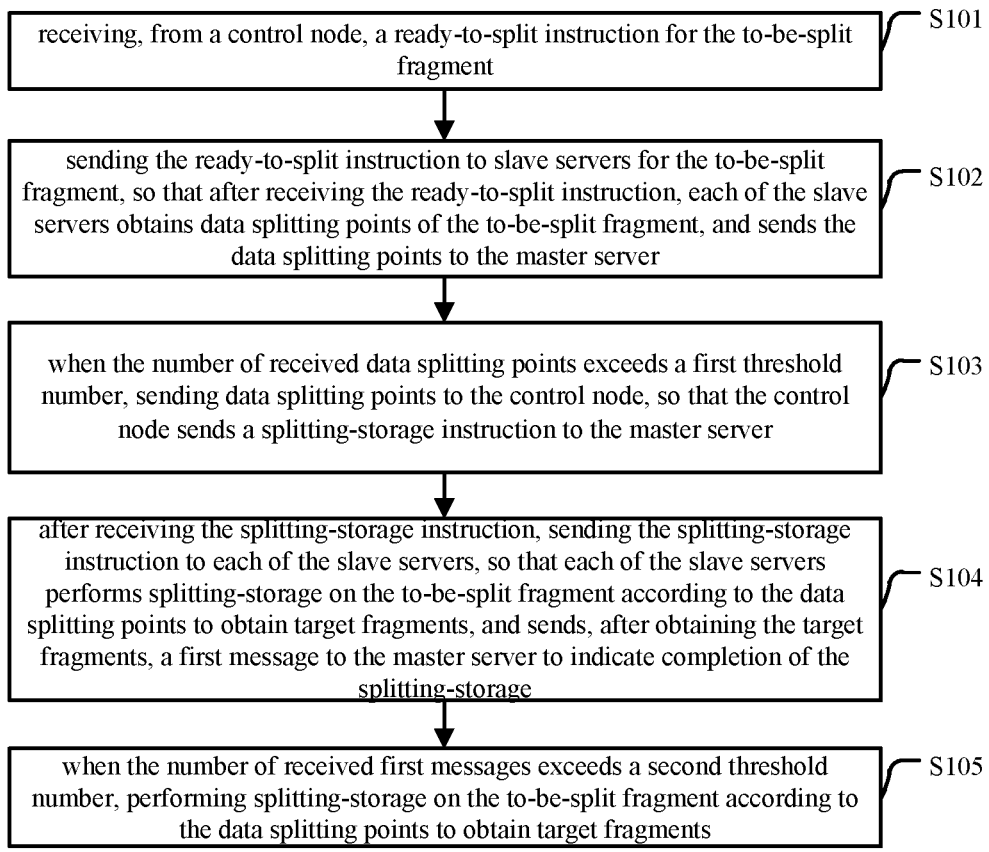
FIG. 1 is a schematic flowchart of a data storage method provided by an embodiment of the present application.

FIG. 1 is a first schematic flowchart of a data storage method provided by an embodiment of the present application, comprising following operations.

S101, receiving, from a control node, a ready-to-split instruction for the to-be-split fragment.

Each fragment corresponds to a unique data storage range. In other words, different fragments store different data. Users can gain access to data stored in each fragment. For example, the user's access frequency to the data stored in each fragment may be the same or different, that is, each fragment corresponds to an access frequency. A fragment with an access frequency greater than a preset access frequency can be determined as a to-be-split fragment. In the embodiment of the present application, the preset access frequency may be determined as required in practice. Embodiments of the present application are not limited in this aspect.

The control node can generate the ready-to-split instruction after receiving a splitting-storage request from the master server for a to-be-split fragment. The control node can also generate the ready-to-split instruction upon a user input splitting-storage request. Details are provided below.

In an implementation, the control node may generate the ready-to-split instruction after receiving the splitting-storage request from the master server for a to-be-split fragment. Specifically, the master server for the fragment can detect whether the volume of data stored in the fragment is greater than a preset storage threshold. If the volume of data stored in the fragment is greater than the preset storage threshold, the server for the fragment can send the splitting-storage request to the control node. The control node generates the ready-to-split instruction after receiving the splitting-storage request from the server for the fragment.

In another implementation, the control node may generate the ready-to-split instruction after receiving a user input splitting-storage request. Specifically, the staff of the storage system can submit a splitting-storage request to the control node when they note a fragment with an access frequency greater than the preset access frequency. After receiving the splitting-storage request, the control node generates the ready-to-split instruction.

The splitting-storage request can contain the identification information of the to-be-split fragment. The identification information can be the name of the to-be-split fragment or the identity (ID) of the to-be-split fragment.

After generating the ready-to-split instruction, the control node can send the ready-to-split instruction to the master server for the to-be-split fragment, so that the master server can perform corresponding operations according to the ready-to-split instruction.

In the embodiment of the present application, the master server may be selected through a Raft algorithm. Servers other than the master server that store the to-be-split fragment are the slave servers. The master server can gain acknowledge of the identification information of other servers that store the to-be-split fragment. The identification information can be the server's name or Internet Protocol (IP) address, etc. After receiving the ready-to-split instruction, the master server determines slave servers according to the identification information of other servers storing the to-be-split fragment, and sends the ready-to-split instruction to the slave servers.

S102, sending the ready-to-split instruction to slave servers for the to-be-split fragment, so that after receiving the ready-to-split instruction, each of the slave servers obtains data splitting points of the to-be-split fragment, and sends the data splitting points to the master server.

After receiving the ready-to-split instruction, the master server sends the ready-to-split instruction to slave servers for the to-be-split fragment. After receiving the ready-to-split instruction, the slave servers can obtain data splitting points of the to-be-split fragment.

In one implementation, the data splitting points can be carried in the ready-to-split instruction, and the slave servers can obtain the data splitting points from the ready-to-split instruction after reception thereof.

In another implementation manner, the slave servers can determine the data splitting points according to a preset data splitting rule. For example, the slave servers can obtain the data storage range of the to-be-split fragment and the data storage volume corresponding to each primary key in the data storage range. According to the data storage range of the to-be-split fragment and the data storage volume corresponding to each primary key, the data splitting points are determined according to the preset data splitting rule.

The slave servers can obtain the data storage range of the to-be-split fragment in many ways. For example, if the data storage range is included in the ready-to-split instruction, the data storage range can be directly obtained from the ready-to-split instruction. In another example, if the data storage range is not included in the ready-to-split instruction, the data storage range can be obtained by scanning the to-be-split fragment. Of course, the data storage range of the to-be-split fragment may be obtained in other manners. Embodiments are not limited in this aspect. Moreover, each data item in the to-be-split fragment corresponds to a primary key, and each data item has a fixed volume of data. Therefore, the data storage volume corresponding to each primary key can be determined by scanning the data stored in the to-be-split fragment.

For example, a data splitting rule is that, the data volume corresponding to data storage ranges of fragments split from a fragment is the same as the data volume corresponding to the data storage range of the to-be-split fragment. Exemplarily, 2 fragments are split from a to-be-split fragment 1 having a data volume of 10G, and primary key intervals of A-F. The primary key intervals constitute the data storage range of fragment 1. For example, the data volume corresponding to the primary key interval A-C is 4.95G, and the data volume corresponding to the primary key interval D-F is 5.05G. If a data splitting point is meant to be a right end of a primary key interval of one of the fragments, the data splitting point is the primary key C. If the data splitting point is meant to be a left end point of a primary key interval of one of the fragments, the data splitting point is the primary key D. In either case, the data storage range of a fragment obtained after splitting is D-F, and the data storage range of the to-be-split fragment after splitting is A-C. If 3 fragments are obtained by splitting, the to-be-split fragment is fragment 2, the volume of data stored in fragment 2 is 15G, the primary key interval of fragment 2 is H-N. If the data volume corresponding to the primary key interval H-J is 4.95G, the data volume corresponding to the primary key interval K-L is 5.05G, and the data volume corresponding to the primary key interval M-N is 5G. The primary keys J and L can be determined as splitting points.

In most distributed storage systems, data is stored in Key-Value pairs. Data is stored in alphabetical order of Keys. Key is the primary key mentioned above. The primary key is the candidate key that is selected as the unique identification of the rows of the table. The primary key can consist of a single field or multiple fields, that is, a single-field primary key or a multi-field primary key. A fragment stores all the data of the corresponding primary key interval.

The data splitting points contained in the ready-to-split instruction can be the data splitting points in the instructions sent to the control node by the staff. The staff can determine the data splitting points according to the access pressure of the data corresponding to each primary key in the shard data.

After obtaining the data splitting points, the slave servers need to send the obtained data splitting points to the master server so that the master server can perform subsequent operations after receiving the data splitting points. In the embodiment of the present application, for the same to-be-split fragment, the data splitting points obtained by all the slave servers are the same.

S103, when the number of received data splitting points exceeds a first threshold number, sending data splitting points to the control node, so that the control node sends a splitting-storage instruction to the master server.

In order to ensure the data obtained by the master server through splitting-storage is the same as data obtained by the slave servers, the master server may assume that most of the slave servers have sent their data splitting points once data splitting points received exceed a first threshold number. The subsequent steps are then executed. This ensures the consistency of the data in a fragment split and stored in different servers as much as possible.

The embodiment of the present application does not specifically limit the first threshold number. For example, if it is assumed that each of the slave servers obtains one data splitting point, then the first threshold number may be half of the number of the slave servers of the master server. Exemplarily, the number of the slave servers is 5, and the first threshold number can be 3. When the master server receives 4 data splitting points, it indicates that 4 slave servers have sent data splitting points to the master server. Subsequent operations can then be performed. In case where data splitting points are received from one slave server, the master server waits until time runs out.

The master server sends the data splitting points to the control node when the number of the data splitting points received is greater than the first threshold number. One purpose of the master server sending the data splitting points to the control node is to notify the control node that the preparation for splitting has been completed, so as to trigger the control node to send the splitting-storage instruction to the master server. The control node receiving the data splitting points means that the master server has responded to the ready-to-split instruction. At this time, the control node needs to send the splitting-storage instruction to the master server to trigger the master server to execute subsequent steps.

At S104, after receiving the splitting-storage instruction, sending the splitting-storage instruction to each of the slave servers, so that each of the slave servers performs splitting-storage on the to-be-split fragment according to the data splitting points to obtain target fragments, and sends, after obtaining the target fragments, a first message to the master server to indicate completion of the splitting-storage.

After receiving the splitting-storage instruction, the master server sends the splitting-storage instruction to each of the slave servers, so that each of the slave servers performs splitting-storage on the to-be-split fragment according to the data splitting points to obtain target fragments. The target fragments are fragments split from the to-be-split fragment. The splitting-storage may be implemented through hard link copy. This may reduce time consumed in the splitting-storage.

A hard link is one or more file names of a file. In this way, multiple file names can be linked to one file through hard links. These file names can be in the same directory or in different directories. Hard links allow multiple file names within or without the same directory. After a file is modified, all files that have hard links with the modified file are also modified. The fragments are split by hard chain copy, and the data stored in the obtained fragments is the same as the data stored in the to-be-split fragment before the splitting-storage. Splitting-storage of the fragments is performed through data migration. The data stored in the obtained fragments can be the same as the data stored before the splitting-storage of the to-be-split fragment, or can be part of the data stored before the splitting-storage of the to-be-split fragment. This depends on the way of splitting-storage. Embodiments are not limited in this aspect.

The slave servers records the correspondence between data storage range of the fragment stored by itself and the data storage location, that is, records the relationship between the primary key interval and the storage location of the data corresponding to the primary key interval. Upon a data reading request or the data storage request, according to the relationship recorded between the data storage range and the data storage location, the location for read or storage is determined. When the splitting-storage of the to-be-split fragment is completed, a data storage range is split into multiple ranges, each of which corresponds to one data storage location. Therefore, the relationship between the data storage range and the data storage location previously recorded for the to-be-split fragment needs to be modified. The data storage range in the relationship recorded for the to-be-split fragment can be modified to a data storage range after splitting. For remaining data storage ranges after splitting, the data storage locations are determined, and the relationship between the determined data storage location and the data storage range is recorded.

Exemplarily, the relationship between a primary key interval A-C stored in the C1 position, the primary key interval after the splitting-storage is the primary key A, the primary key interval B-C, and the relationship between the primary key interval A-C and the C1 position is modified to obtain the relationship between the positions of the primary key A and C1, the data storage position of the primary key interval B-C is determined to be C2, then the relationship between the positions of the primary key interval B-C and C2 is recorded. This enables the subsequent data to be read from the correct location and the data can be stored in the correct location. The slave servers sends the first messages to the master server after obtaining the target fragment, completing the modification of the data storage range and data storage location, and recording the relationship between the data storage range and the data storage location obtained after the splitting, to notify the master server that the splitting-storage of its own fragments has been completed.

At S105, when the number of received first messages exceeds a second threshold number, performing splitting-storage on the to-be-split fragment according to the data splitting points to obtain target fragments.

After completing the splitting-storage, each of the slave servers will send a message to the master server to indicate completion of the splitting-storage. When the number of first messages received by the master server is greater than the second threshold number, according to the data splitting points, the splitting-storage operation of a target fragment stored by the master server will be performed. The specific splitting-storage method is the same as the splitting-storage method of the to-be-split fragment by the slave servers.

The second threshold number and the first threshold number may be the same or different. Embodiments are not limited in this aspect.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In an embodiment of the present application, after performing splitting-storage on the to-be-split fragment according to the data splitting points to obtain target fragments when the number of received first messages exceeds a second threshold number, the method further comprises:

sending a first message to the control node, so that the control node determines, after receiving the first message, data storage ranges of the target fragments and a target data storage range based on the data splitting points and a data storage range of the to-be-split fragment before the splitting-storage; and updating a pre-recorded data storage range of the to-be-split fragment to the target data storage range, and recording correspondence between target fragments and data storage ranges determined for the target fragments, wherein, the target data storage range is a data storage range of the to-be-split fragment after the splitting-storage.

In other words, after completing the splitting-storage of the to-be-split fragment, the master server can send a first message to the control node. After receiving the first message, the control node may determine that the master server and the slave servers have completed the splitting-storage of the to-be-split fragment. Then the control node determines data storage ranges of target fragments and a target data storage range according to the data splitting points and a data storage range of the to-be-split fragment before the splitting-storage. For example, the control node first splits the data storage range of the to-be-split fragment before splitting according to the data splitting points to obtain the data storage range after splitting; then selects one of the storage ranges as the data storage range of the to-be-split fragment after the splitting-storage. The selected data storage range is the data storage range of the to-be-split fragment after the splitting-storage, that is, the target data storage range. Furthermore, the control node can update the data storage range in the correspondence previously recorded for the to-be-split fragment, that is, update the pre-recorded data storage range corresponding to the to-be-split fragment to the target data storage range. At the same time, from the remaining data storage ranges after splitting, the data storage range of the target fragment is selected, and the correspondence between the selected data storage range and the target fragment is recorded.

A data storage range may be randomly selected from data storage ranges, or selected according to preset selection rules. Exemplarily, the to-be-split fragment is fragment 3, having a data storage range of primary keys P-T, and a data splitting point of a primary key R is obtained. In this case, one data storage range is the primary key P-R, and another data storage range is the primary key S-T. One of the two data storage ranges is the data storage range of the to-be-split fragment after the splitting-storage. Which one of the data storage ranges is the data storage range of the to-be-split fragment after the splitting-storage needs to be determined according to the preset rules. If the data storage range with a smaller right end value is set in advance as the data storage range of the to-be-split fragment after the splitting-storage, the data storage range composed of the primary key P-R is the data storage range of fragment 3 after the splitting-storage. If the data storage range with a larger right end value is set in advance as the data storage range of the to-be-split fragment after the splitting-storage. The data storage range composed of the primary key S-T is the data storage range of fragment 3 after splitting-storage.

In the embodiment of the present application, the data storage range of the to-be-split fragment after the splitting-storage is within the data storage range of the to-be-split fragment before the splitting-storage, and the to-be-split fragment after the splitting-storage The data storage range of be split is smaller than the data storage range of the to-be-split fragment before the splitting-storage.

The update of the data storage range of to-be-split fragment the after splitting-storage and establishment of the correspondence between target fragments and the data storage ranges determined for the target fragments can ensure that the subsequent data can be correctly stored to the corresponding The sharding can also ensure that the correct data can be read according to the data read request in the future.

In an embodiment of the present application, when data stored in the target fragment is the same as data stored in the to-be-split fragment, the method further comprises:

obtaining correspondence between all fragments and data storage ranges; and based on the obtained correspondence, determining whether any fragment on the master server stores data outside the data storage range of the fragment; if so, deleting the data outside the data storage range of the fragment.

In one case, the data stored in the target fragment is the same as the data stored in the to-be-split fragment. This indicates that there is redundant data in the target fragment. In another case, the data stored before and after the splitting-storage by the to-be-split fragment is the same. This indicates that redundant data is stored in the to-be-split fragment after the split.

Then, in order to save storage resources, and to reduce the possibility of further splitting-storage on the fragment due to the excessive volume of redundant data, redundant data is to be deleted from each fragment. The way to delete can be: first obtaining the correspondence between all fragments and data storage ranges, where the correspondence between fragments and data storage ranges can be stored in the control node; then, according to the obtained correspondence, determining whether any fragment stored on the mater server stores data outside the data storage range of the fragment, that is, determining whether any fragment stored on the master server stores redundant data. For example, a determination can be made as to whether the primary key of the fragment stored in the fragment is in the data storage range of the fragment one by one. If so, it means that there is redundant data in the fragment. The data corresponding to the primary key of the data storage range outside the fragment is redundant data. The redundant data can be deleted, that is, data outside the data storage range of the fragment is deleted. If not, it means that there is no redundant data in the fragment.

In this embodiment of the present application, the correspondence between the obtained fragments and the data storage range may be obtained periodically, or may be obtained after the splitting-storage is completed. Deletion of redundant data in a fragment can save storage resources, reduce the possibility of performing splitting-storage on the fragment again due to the excessive volume of redundant data, and also reduce number of the splitting-storage operations of the server to which the shard belongs.

In an embodiment of the present application, the method further comprises:

obtaining a data storage request for the to-be-split fragment, wherein the data storage request comprises to-be-stored data;

in a case that no splitting-storage instruction is received, sending the data storage request to the slave servers, so that each of the slave servers stores the to-be-stored data to the to-be-split fragment, and sends a second message to the master server; wherein, the second message indicates completion of data storage; and storing, when the number of received second messages exceeds the second threshold number, the to-be-stored data to the to-be-split fragment; and in a case that a splitting-storage instruction is received, determining whether a first message has been sent to the control node; if the first message has been sent, sending the data storage request to the slave servers, so that each of the slave servers determines a fragment to store the to-be-stored data from the target fragments and the to-be-split fragment after the splitting-storage, stores the to-be-stored data to the fragment determined, and sends a second message to the master server; determining, when the number of received second messages exceeds the second threshold number, a fragment to store the to-be-stored data from the target fragments and the to-be-split fragment after the splitting-storage, and storing the to-be-stored data to the fragment determined; if no first message has been sent, after sending the first message to the control node, performing the step of sending the data storage request to the slave servers.

In the embodiment of the present application, the storage of data and the splitting-storage of the fragment are parallel, and the splitting-storage of the fragment does not affect the reception of a data storage request. If the master server receives a data storage request without a splitting-storage instruction, that is, the fragment storage has not been performed, the data storage request can be sent to the slave servers. After receiving the data storage request, the slave servers store the to-be-stored data in the to-be-split fragment. After the storage is completed, the slave servers send the second messages, i.e., the messages for completion of data storage, to the master server. The master server stores the to-be-stored data in its to-be-split fragment when the number of the second messages received exceeds the second threshold number. In the above storage process, if the master server receives the splitting-storage instruction during data storage, that is, during data writing operation, the splitting-storage instruction is recorded. For example, the splitting-storage instruction can be written into the metadata database. After the write operation is completed, the splitting-storage instruction is sent to each of the slave servers.

Before receiving the splitting-storage instruction, if the master server receives the splitting-storage instruction, the to-be-split fragment at this moment is either in an in-splitting-storage state or in a splitting-storage completed state. In the in-splitting-storage state, the data storage for the to-be-split fragment cannot be performed. If it is in the splitting-storage completed state, the data storage for the to-be-split fragment can be performed. Therefore, a determination is to be made as to whether the master server sends the first messages to the control node. If the first messages are sent, it means that the master server and the slave servers have completed the splitting-storage of the fragment. At this point, the data storage request can be sent to the slave servers, and the slave servers determine fragments to store the to-be-stored data t from the target fragments and the to-be-split fragment after the splitting-storage. The specific determination method can be: obtaining the primary key of the to-be-stored data, and matching the obtained primary key with the data storage range of the to-be-split fragment after the splitting-storage. If the match is successful, the to-be-stored data can be stored to the to-be-split fragment after splitting-storage. If the match fails, in the case that there is one target fragment, the to-be-stored data can be stored in the target fragment. In the case that there are more than one target fragments, then the to-be-stored data can be stored in the target fragments the data storage ranges of which match the obtained primary key. After the fragment is determined, the to-be-stored data is stored in the determined fragment.

After storing the to-be-stored data in the determined fragment, the slave servers send the messages for completion of data storage, i.e., the second messages, to the master server. The master server performs a data storage operation when the number of the second messages received is greater than the second threshold number. The data storage operation performed by the master server is the same as the data storage operation performed by the slave servers. During the period from the master server receiving the ready-to-split instruction to the master server receiving the splitting-storage instruction, the execution of the data storage request will not be affected.

According to the embodiment of the present application, when both the target fragment and the to-be-split fragment after the splitting-storage exist, the to-be-stored data needs to be stored in the target fragment or the to-be-split fragment after splitting-storage, the performance is sacrificed slightly in exchange for allowing the split fragment to be writable during the process of the fragment. In the process of the data splitting-storage, the read and write operations are still supported, which can improve the availability of the distributed storage system.

Figure 2:
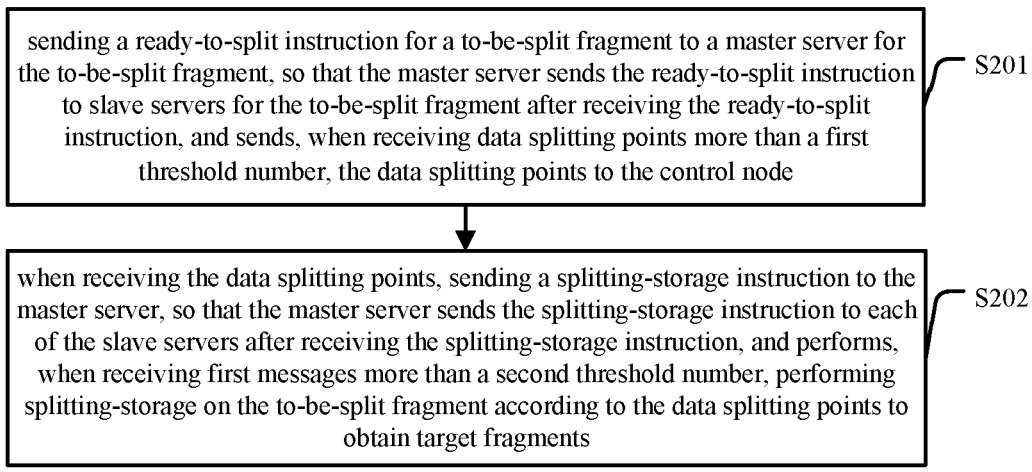
FIG. 2 is another schematic flowchart of a data storage method provided by an embodiment of the present application.

FIG. 2 is another schematic flowchart of a data storage method applicable to a control node provided by an embodiment of the present application, the method comprises following operations.

S201, sending a ready-to-split instruction for a to-be-split fragment to a master server for the to-be-split fragment, so that the master server sends the ready-to-split instruction to slave servers for the to-be-split fragment after receiving the ready-to-split instruction, and sends, when receiving data splitting points more than a first threshold number, the data splitting points to the control node.

The control node can generate the ready-to-split instruction after receiving the splitting-storage request sent by the master server for a fragment. This fragment is the to-be-split fragment. The control node can also generate the ready-to-split instruction after receiving the instruction sent by the staff for the splitting-storage of the fragment.

The control node sends the ready-to-split instruction to the master server for a to-be-split fragment. The master server sends the ready-to-split instruction to the slave servers for the to-be-split fragment. The slave servers receive the ready-to-split instruction, and obtain data splitting points, and send the obtained data splitting points to the master server. The master server sends the data splitting points to the control node when received data splitting points exceed a first threshold number. The above process has been described in detail in S101-S103, and will not be repeated here.

S202, when receiving the data splitting points, sending a splitting-storage instruction to the master server, so that the master server sends the splitting-storage instruction to each of the slave servers after receiving the splitting-storage instruction, and performs, when receiving first messages more than a second threshold number, performing splitting-storage on the to-be-split fragment according to the data splitting points to obtain target fragments.

After receiving the data splitting points, the control node can determine that the master server and the slave servers can start the splitting-storage of the fragment, and then send the splitting-storage instruction to the master server. After receiving the splitting-storage instruction, the master server sends the splitting-storage instruction to the slave servers. After receiving the splitting-storage instruction, the slave servers will perform splitting-storage on the to-be-split fragment to obtain the target fragment. After obtaining the target fragment, the first messages are sent to the master server. When the number of the first messages received by the master server is greater than the second threshold number, the splitting-storage operation of the fragment is performed, splitting-storage of the to-be-split fragment is performed and the target fragment is obtained. The above process has been described in detail in S103-S104, and will not be repeated here.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In an embodiment of the present application, after the step of sending a splitting-storage instruction to the master server when receiving the data splitting points, the method further comprises:

after receiving the first message sent by the master server, determining data storage ranges of the target fragments and a target data storage range according to the data splitting points and a data storage range of the to-be-split fragment before the splitting-storage; and updating a pre-recorded data storage range of the to-be-split fragment to the target data storage range, and recording correspondence between target fragments and data storage range determined for the target fragments, wherein the target data storage range is a data storage range of the to-be-split fragment after the splitting-storage.

After receiving the first messages, the control node can determine that the master server and the slave servers have completed the splitting-storage of the to-be-split fragment. At this time, the control node determines the data storage range of the target fragment and the target data storage range according to the data splitting points and a data storage range for the to-be-split fragment before the splitting-storage. For example, a data storage range can be selected from the data storage ranges after the splitting-storage as the to-be-split fragment after the splitting-storage, and the selected data storage range is the data storage range of the to-be-split fragment after the splitting-storage, i.e., the target data storage range. Furthermore, the control node can update the data storage range in the correspondence previously recorded for the to-be-split fragment, that is, update the pre-recorded data storage range corresponding to the to-be-split fragment to the target data storage range. At the same time, from the remaining split data storage ranges, the data storage range of the target fragment is selected, and the correspondence between the selected data storage range and the target fragment is recorded.

In the embodiment of the present application, updating the data storage range of the to-be-split fragment after splitting-storage, and establishing the correspondence between the target fragments and the data storage ranges determined for the target fragments can ensure that the subsequent data can be correctly stored in the corresponding fragment, and also ensure that the correct data can be read according to the data read request in the future.

In an embodiment of the present application, the method further comprises:

sending, to servers, a gather instruction for data storage ranges of all fragments, so that after receiving the gather instruction, each of servers obtains data storage ranges of all fragments stored thereon, and sends obtained data storage ranges to the control node; wherein, the servers include the master server and the slave servers;

after receiving data storage ranges sent by the servers, determining, for each fragment, whether a pre-recorded state of the fragment is an in-splitting-storage state;

if pre-recorded state of the fragment is the in-splitting-storage state, determining whether a pre-recorded data storage range of the fragment is the same as the obtained data storage range of the fragment;

if the pre-recorded data storage range of the fragment is the same as the obtained data storage range, sending a splitting-storage instruction to the master server for the fragment; and if the pre-recorded data storage range of the fragment is not the same as the obtained data storage range, changing the pre-recorded state of the fragment to a splitting-storage completed state.

In the embodiment of the present application, when the control node sends a splitting instruction to the master server, the state of the to-be-split fragment is changed from the splitting completed state to in-splitting-storage state. After the control node receives the first message sent by the master server, the state of the to-be-split fragment after the splitting-storage is changed from the in-splitting-storage state to the split completion state, and the state of the target fragments obtained by splitting is recorded as the split completion state.

After the control node fails and is repaired, a gather instruction for the data storage ranges of all fragment is sent to all servers. The gather instruction is used to gather the data storage ranges of fragments in each server. After receiving the data storage range of each fragment feedback from each server, the control node determines whether the pre-recorded state corresponding to a fragment is the in-splitting-storage state. If it is the in-splitting-storage state, further determination as to whether the pre-recorded data storage range corresponding to the fragment is the same as the obtained data storage range of the fragment is to made to proceed to the next step. However, if the recorded state is the split completion state, it means that the fragment is in the split completion state at this time, and further indicates that splitting-storage of the fragment is not required at present, or the splitting-storage of the fragment has been completed. There is no need to modify the data storage range of the fragment recorded by the control node in both cases above. If the data storage range is the same and the state recorded for the fragment is the splitting-and-storing state, it means that the master server and the slave servers have completed the splitting-storage of the fragment, in order to ensure that the state recorded by the control node is the same as the actual state of the fragment, the splitting-storage instruction needs to be sent to the master server for the fragment to perform the splitting-storage of the fragment.

If the state of the fragment recorded by the control node is the in-splitting-storage state, but the data storage range of the fragment is different from the actual data storage range of the fragment, it means that the master server and/or the slave server has completed the splitting-storage of the fragment. In order to make the recorded state of the fragment the same as the actual state of the fragment, the state recorded by the control node needs to be modified to the split completion state.

According to the embodiment of the present application, the control node can record states of fragments; gather data storage ranges of fragments stored in the server when a fault is fixed; determining the instructions to be sent according to the recorded states, the data storage ranges of the fragments and the gathered data storage ranges of the fragments; send the instructions to the master server for a fragment, and continue to complete the data storage operation, so that the distributed storage system will be recovered without damage when it exits abnormally.

Figure 3:
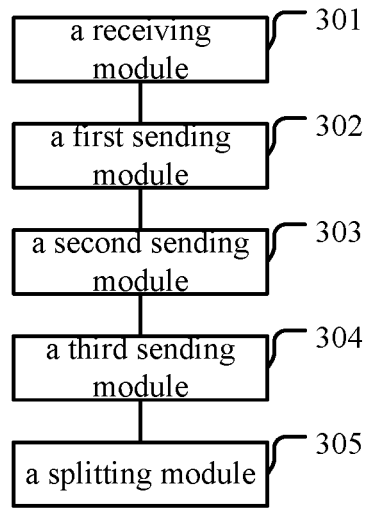
FIG. 3 is a schematic structural diagram of a data storage apparatus provided by an embodiment of the present application.

The embodiment of the present application provides a data storage apparatus applicable to a master server for a to-be-split fragment, as shown in FIG. 3, the apparatus comprises:

a receiving module 301, configured for receiving, from a control node, a ready-to-split instruction for the to-be-split fragment;

a first sending module 302, configured for sending the ready-to-split instruction to slave servers for the to-be-split fragment, so that after receiving the ready-to-split instruction, each of the slave servers obtains data splitting points of the to-be-split fragment; and sends the data splitting points to the master server;

a second sending module 303, configured for sending, when the number of received data splitting points exceeds a first threshold number, data splitting points to the control node, so that the control node sends a splitting-storage instruction to the master server;

a third sending module 304, configured for sending, after receiving the splitting-storage instruction, the splitting-storage instruction to each of the slave servers, so that each of the slave servers performs splitting-storage on the to-be-split fragment according to the data splitting points to obtain target fragments, and sends, after obtaining the target fragments, a first message to the master server to indicate completion of the splitting-storage; and a splitting module 305, configured for performing, when the number of received first messages exceeds a second threshold number, performing splitting-storage on the to-be-split fragment according to the data splitting points to obtain target fragments.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In an embodiment of the present application, the apparatus further comprises:

a forth sending module, configured for sending a first message to the control node, so that the control node determines, after receiving the first message, data storage ranges of the target fragments and a target data storage range based on the data splitting points and a data storage range of the to-be-split fragment before the splitting-storage; and updating a pre-recorded data storage range of the to-be-split fragment to the target data storage range, and recording correspondence between target fragments and data storage ranges determined for the target fragments, wherein, the target data storage range is a data storage range of the to-be-split fragment after the splitting-storage.

In an embodiment of the present application, the apparatus further comprises:

a first obtaining module, configured for obtaining correspondence between all fragments and data storage ranges when data stored in the target fragment is the same as data stored in the to-be-slit fragments:

a first determining module, configured for based on the obtained correspondence, determining whether any fragment on the master server stores data outside the data storage range of the fragment; and a deleting module, configured for deleting the data outside the data storage range of the fragment if there is such a fragment.

In an embodiment of the present application, the apparatus further comprises:

a second obtaining module, configured for obtaining a data storage request for the to-be-split fragment, wherein the data storage request comprises to-be-stored data;

a fifth sending module, configured for in a case that no splitting-storage instruction is received, sending the data storage request to the slave servers, so that each of the slave servers stores the to-be-stored data to the to-be-split fragment, and sends a second message to the master server; wherein, the second message indicates completion of data storage;

a first storage module, configured for storing, when the number of received second messages exceeds the second threshold number, the to-be-stored data to the to-be-split fragment;

a second determining module, configured for in a case that a splitting-storage instruction is received, determining whether a first message has been sent to the control node;

a sixth sending module, configured for if the first message has been sent, sending the data storage request to the slave servers, so that each of the slave servers determines a fragment to store the to-be-stored data from the target fragments and the to-be-split fragment after the splitting-storage, stores the to-be-stored data to the fragment determined, and sends a second message to the master server; and a second storage module, configured for determining, when the number of received second messages exceeds the second threshold number, a fragment to store the to-be-stored data from the target fragments and the to-be-split fragment after the splitting-storage, and storing the to-be-stored data to the fragment determined;

the sixth sending module is further configured for, if no first message has been sent, after sending the first message to the control node, performing the step of sending the data storage request to the slave servers.

Figure 4:
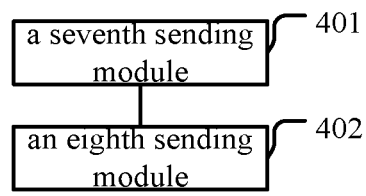
FIG. 4 is another schematic structural diagram of a data storage apparatus provided by an embodiment of the present application.
Figure 5:
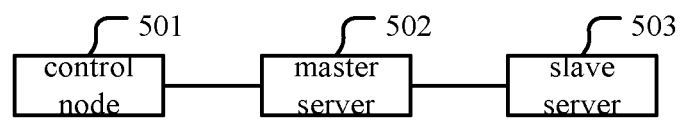
FIG. 5 is a schematic structural diagram of a data storage system provided by an embodiment of the present application.

The embodiment of the present application provides a data storage apparatus applied to a control node, as shown in FIG. 4, the apparatus comprises:

a seventh sending module 401, configured for sending a ready-to-split instruction for a to-be-split fragment to a master server for the to-be-split fragment, so that the master server sends the ready-to-split instruction to slave servers for the to-be-split fragment after receiving the ready-to-split instruction, and sends, when receiving data splitting points more than a first threshold number, the data splitting points to the control node; and an eighth sending module 402, configured for when receiving the data splitting points, sending a splitting-storage instruction to the master server, so that the master server sends the splitting-storage instruction to each of the slave servers after receiving the splitting-storage instruction, and performs, when receiving first messages more than a second threshold number, performing splitting-storage on the to-be-split fragment according to the data splitting points to obtain target fragments.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In an embodiment of the present application, the apparatus further comprises:

a determining module, configured for after receiving the first message sent by the master server, determining data storage ranges of the target fragments and a target data storage range according to the data splitting points and a data storage range of the to-be-split fragment before the splitting-storage; and a first modifying module, configured for updating a pre-recorded data storage range of the to-be-split fragment to the target data storage range, and recording correspondence between target fragments and data storage ranges determined for the target fragments, wherein the target data storage range is a data storage range of the to-be-split fragment after the splitting-storage.

In an embodiment of the present application, the apparatus further comprises:

a ninth sending module, configured for sending, to servers, a gather instruction for data storage ranges of all fragments, so that after receiving the gather instruction, each of servers obtains data storage ranges of all fragments stored thereon, and sends obtained data storage ranges to the control node; wherein, the servers include the master server and the slave servers;

a third determining module, configured for after receiving data storage ranges sent by the servers, determining, for each fragment, whether a pre-recorded state of the fragment is an in-splitting-storage state;

a forth determining module, configured for if pre-recorded state of the fragment is the in-splitting-storage state, determining whether a pre-recorded data storage range of the fragment is the same as the obtained data storage range of the fragment;

a tenth sending module, configured for if the pre-recorded data storage range of the fragment is the same as the obtained data storage range, sending a splitting-storage instruction to the master server for the fragment; and a second modifying module, configured for, if the pre-recorded data storage range of the fragment is not the same as the obtained data storage range, changing the pre-recorded state of the fragment to a splitting-storage completed state.

The embodiment of the present application provides a data storage system, the system comprises a control node 501, a master server 502 for a to-be-split fragment, and slave servers 503 for the to-be-split fragment, wherein, the control node 501 is configured for sending a ready-to-split instruction for the to-be-split fragment to the master server;

the master server 502 is configured for sending the ready-to-split instruction to slave servers for the to-be-split fragment after receiving the ready-to-split instruction;

the slave severs 503 are configured for obtains data splitting points of the to-be-split fragment after receiving the ready-to-split instruction, and sending the data splitting points to the master server;

the master server 502 is further configured for sending, when the number of received data splitting points exceeds a first threshold number, data splitting points to the control node;

the control node 501 is further configured for sending a splitting-storage instruction to the master server after receiving the data splitting points from the master server;

the master server 502 is further configured for sending the splitting-storage instruction to each of the slave servers after receiving the splitting-storage instruction;

the slave severs 503 are further configured for performing splitting-storage on the to-be-split fragment according to the data splitting points to obtain target fragments, and sending a first message to the master server to indicate completion of the splitting-storage; and the master server 502 is further configured for performing, when the number of received first messages exceeds a second threshold number, splitting-storage on the to-be-split fragment according to the data splitting points to obtain target fragments.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In an embodiment of the present application, the master server is further configured to send a first message to the control node;

the control node is further configured for, after receiving the first message sent by the master server, determining data storage ranges of the target fragments and a target data storage range according to the data splitting points and a data storage range of the to-be-split fragment before the splitting-storage; and updating a pre-recorded data storage range of the to-be-split fragment to the target data storage range, and recording correspondence between target fragments and data storage range determined for the target fragments, wherein the target data storage range is a data storage range of the to-be-split fragment after the splitting-storage.

In an embodiment of the present application, the master server is further configured for, when data stored in the target fragments is the same as the data stored in the to-be-split fragment, obtaining correspondence between all fragments and data storage ranges; and based on the obtained correspondence, determining whether any fragment on the master server stores data outside the data storage range of the fragment; if so, deleting the data outside the data storage range of the fragment.

In an embodiment of the present application, the master server is further configured for obtaining a data storage request for the to-be-split fragment, wherein the data storage request comprises to-be-stored data; and in a case that no splitting-storage instruction is received, sending the data storage request to the slave servers;

the slave sever is further configured for storing the to-be-stored data to the to-be-split fragment, and sending a second message to the master server; wherein, the second message indicates completion of data storage;

the master server is further configured for storing the to-be-stored data to the to-be-split fragment when the number of the second messages received meets the second number of threshold values;

the master server is further configured for in a case that a splitting-storage instruction is received, determining whether a first message has been sent to the control node; if the first message has been sent, sending the data storage request to the slave servers;

the slave sever is further configured for determining a fragment to store the to-be-stored data from the target fragments and the to-be-split fragment after the splitting-storage, storing the to-be-stored data to the fragment determined, and sending a second message to the master server;

the master server is further configured for determining, when the number of received second messages exceeds the second threshold number, a fragment to store the to-be-stored data from the target fragments and the to-be-split fragment after the splitting-storage, and storing the to-be-stored data to the fragment determined; if no first message has been sent, after sending the first message to the control node, performing the step of sending the data storage request to the slave servers.

In an embodiment of the present application, the master server is further configured for after receiving the first messages sent by the master server, determining a data storage range and a target data storage range of the target fragment based on the data splitting points and the data storage range corresponding to the to-be-split fragment before the splitting-storage; updating a pre-recorded data storage range corresponding to the to-be-split fragment to the target data storage range, and recording the correspondence between the target fragment and the data storage range determined for the target fragment, wherein, the target data storage range is the data storage range of the to-be-split fragment after the splitting-storage.

In an embodiment of the present application, the control node is further configured for sending a gather instruction for the data storage range of each fragment to each of the servers, wherein, the servers include the master server and the slave server;

the slave sever is configured for after receiving the gather instruction, obtaining the data storage range of each fragment stored by itself, and sending the data storage range obtained to the control node;

the control node is further configured for after receiving the data storage range sent by each of the servers, determining, for each fragment, whether a pre-recorded state corresponding to the fragment is a splitting-and-storing state; if pre-recorded state corresponding to the fragment is the splitting-and-storing state, determining whether the pre-recorded data storage range corresponding to the fragment is the same as the data storage range of the fragment obtained; if the pre-recorded data storage range corresponding to the fragment is the same as the data storage range of the fragment obtained, sending the splitting-storage instruction to the master server to which the fragment belongs; if the pre-recorded data storage range corresponding to the fragment is not the same as the data storage range of the fragment obtained, modifying the pre-recorded state corresponding to the fragment to a splitting-storage completed state.

Figure 6:
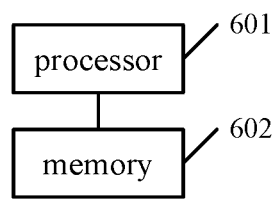
FIG. 6 is a schematic structural diagram of a master server provided by an embodiment of the present application.

The embodiment of the present application further provides a main server as shown in FIG. 6, comprising a processor 601 and a memory 602.

The memory 602 is configured for storing a computer program.

The processor 601 is configured for executing the computer program stored in the memory 602 to perform the following steps:

receiving, from a control node, a ready-to-split instruction for the to-be-split fragment;

sending the ready-to-split instruction to slave servers for the to-be-split fragment, so that after receiving the ready-to-split instruction, each of the slave servers obtains data splitting points of the to-be-split fragment, and sends the data splitting points to the master server;

when the number of received data splitting points exceeds a first threshold number, sending data splitting points to the control node, so that the control node sends a splitting-storage instruction to the master server;

after receiving the splitting-storage instruction, sending the splitting-storage instruction to each of the slave servers, so that each of the slave servers performs splitting-storage on the to-be-split fragment according to the data splitting points to obtain target fragments, and sends, after obtaining the target fragments, a first message to the master server to indicate completion of the splitting-storage; and when the number of received first messages exceeds a second threshold number, performing splitting-storage on the to-be-split fragment according to the data splitting points to obtain target fragments.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including a central processing unit (CPU), a network processor (NP), etc.; or may be a digital signal processing (DSP), an application specific integrated circuit (ASIC), field-programmable gate array (FPGA) or other programmable logic device, discrete gate or transistor logic device, discrete hardware component.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

Figure 7:
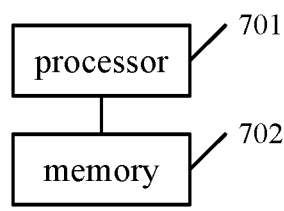
FIG. 7 is a schematic structural diagram of a control node provided by an embodiment of the present application.

The embodiment of the present application further provides a control node as shown in FIG. 7, comprising a processor 701 and a memory 702.

The memory 702 is configured for storing computer programs.

The processor 701 is configured for executing the computer programs stored in the memory 702 to implement the following steps:

sending a ready-to-split instruction for a to-be-split fragment to a master server for the to-be-split fragment, so that the master server sends the ready-to-split instruction to slave servers for the to-be-split fragment after receiving the ready-to-split instruction, and sends, when receiving data splitting points more than a first threshold number, the data splitting points to the control node; and when receiving the data splitting points, sending a splitting-storage instruction to the master server, so that the master server sends the splitting-storage instruction to each of the slave servers after receiving the splitting-storage instruction, and performs, when receiving first messages more than a second threshold number, performing splitting-storage on the to-be-split fragment according to the data splitting points to obtain target fragments.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

Another embodiment of the present application further provides a computer-readable storage medium, having a computer program stored thereon which, when executed by a processor, causes the processor to perform the data storage method applicable to the main server provided by the above mentioned embodiment of the present application.

In the embodiment of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

Another embodiment of the present application further provides a computer-readable storage medium, having stored thereon a computer program which, when executed by a processor, causes the processor to perform the data storage method applicable to the control node provided by the above mentioned embodiments of the present application.

In the embodiment of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In another embodiment of the present application, a computer program product is provided, containing instructions which, when executed on a computer, causes the computer to implement any of the data storage methods applicable to a master server provided by the above mentioned embodiment of the present application.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In another embodiment of the present application, a computer program product is provided, containing instructions which, when executed on a computer, causes the computer to implement any of the data storage methods applicable to a control node provided by the above mentioned embodiment of the present application.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In another embodiment of the present application, a computer program is provided which, when executed on a computer, causes the computer to implement any of the data storage methods applicable to a master server provided by the above mentioned embodiment of the present application.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

In another embodiment of the present application, there further provides a computer program that, upon executed on a computer, causes the computer to implement any of the data storage methods applied to a control node provided by the above mentioned embodiment of the present application.

In the embodiments of the present application, the control node sends the ready-to-split instruction to the master server for a to-be-split fragment. The master server sends the ready-to-split instruction to the slave servers for a to-be-split fragment. The slave servers obtain the data splitting points of the to-be-split fragment, and send the data splitting points to the master server. The master server sends the data splitting points to the control node when the number of the data splitting points received is greater than the first threshold number. After receiving the data splitting points, the control node sends the splitting-storage instruction, the master server and the slave servers perform splitting-storage on the to-be-split fragment, and each of the slave servers performs splitting-storage on the to-be-split fragment according to the data splitting points. After obtaining the target fragments, each slave server sends a first message to the master server. When the number of received first messages is greater than the second threshold number, the splitting-storage is performed on the to-be-split fragment according to the data splitting points to obtain the target fragments. It can be seen that in the technical solution provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragments can thus be obtained. During the splitting-storage process, the to-be-split fragment remains readable and writable, rather than non-writable as in the prior art that. The availability of the storage system is improved. In addition, the master server and the slave servers perform splitting-storage after obtaining the splitting-storage instruction, without the synchronization by the control node. Dependence on the control node can be reduced, and the control node can be prevented from going down resulted from the performance bottleneck of the control node due to excessive dependence thereon. The reliability of the distributed storage system is improved.

Since the embodiments of the apparatus/system/main server/control node and the computer-readable storage medium are basically similar to the foregoing method embodiment, the description is relatively simple, and for related parts, please refer to the part of the description of the method embodiment.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which comprise these elements.

Each embodiment in this specification is described in a related manner, and the same or similar parts between the various embodiments can be referred to each other, and each embodiment focuses on the difference from other embodiments. In particular, as for the system embodiment, since it is basically similar to the method embodiment, the description is relatively simple, and for related parts, please refer to the part of the description of the method embodiment.

The above description is only the preferred embodiments of the present application and is not intended to limit the protection scope of the present application. Any amendments, equivalent substitutions, improvements etc. made within the spirit and principle of the present application are all included in the protection scope of the present application.

INDUSTRIAL APPLICABILITY

In the technology provided by the embodiment of the present application, the slave servers obtains the data splitting points of the to-be-split fragment, and sends the data splitting points to the master server, so that the master server and the slave servers can perform splitting-storage on the to-be-split fragment according to the same data splitting points, and the same target fragment can be obtained. During the splitting-storage process, the to-be-split fragment can continue to be read and written, rather than in the prior art that, the state of the to-be-split fragment is set non-writable, thereby improving the availability of the storage system.

What is claimed is:

1. A data storage method applicable to a master server for a to-be-split fragment, comprising:
receiving, from a control node, a ready-to-split instruction for the to-be-split fragment;
sending the ready-to-split instruction to slave servers for the to-be-split fragment, so that after receiving the ready-to-split instruction, each of the slave servers obtains data splitting points of the to-be-split fragment, and sends the data splitting points to the master server;
when the number of received data splitting points exceeds a first threshold number, sending data splitting points to the control node, so that the control node sends a splitting-storage instruction to the master server;
after receiving the splitting-storage instruction, sending the splitting-storage instruction to each of the slave servers, so that each of the slave servers performs splitting-storage on the to-be-split fragment according to the data splitting points to obtain target fragments, and sends, after obtaining the target fragments, a first message to the master server to indicate completion of the splitting-storage; and
when the number of received first messages exceeds a second threshold number, performing splitting-storage on the to-be-split fragment according to the data splitting points to obtain target fragments.

2. The method according to claim 1, wherein after performing splitting-storage on the to-be-split fragment according to the data splitting points to obtain target fragments when the number of received first messages exceeds a second threshold number, the method further comprises:

sending a first message to the control node, so that the control node determines, after receiving the first message, data storage ranges of the target fragments and a target data storage range based on the data splitting points and a data storage range of the to-be-split fragment before the splitting-storage; and updating a pre-recorded data storage range of the to-be-split fragment to the target data storage range, and recording correspondence between target fragments and data storage ranges determined for the target fragments, wherein, the target data storage range is a data storage range of the to-be-split fragment after the splitting-storage.

3. The method according to claim 2, wherein, when data stored in the target fragments is the same as the data stored in the to-be-split fragment, the method further comprises:

obtaining correspondence between all fragments and data storage ranges; and based on the obtained correspondence, determining whether any fragment on the master server stores data outside the data storage range of the fragment; if so, deleting the data outside the data storage range of the fragment.

4. The method according to claim 1, further comprising:

obtaining a data storage request for the to-be-split fragment, wherein the data storage request comprises to-be-stored data;

in a case that no splitting-storage instruction is received, sending the data storage request to the slave servers, so that each of the slave servers stores the to-be-stored data to the to-be-split fragment, and sends a second message to the master server; wherein, the second message indicates completion of data storage; and storing, when the number of received second messages exceeds the second threshold number, the to-be-stored data to the to-be-split fragment; and in a case that a splitting-storage instruction is received, determining whether a first message has been sent to the control node; if the first message has been sent, sending the data storage request to the slave servers, so that each of the slave servers determines a fragment to store the to-be-stored data from the target fragments and the to-be-split fragment after the splitting-storage, stores the to-be-stored data to the fragment determined, and sends a second message to the master server; determining, when the number of received second messages exceeds the second threshold number, a fragment to store the to-be-stored data from the target fragments and the to-be-split fragment after the splitting-storage, and storing the to-be-stored data to the fragment determined; if no first message has been sent, after sending the first message to the control node, performing the step of sending the data storage request to the slave servers.

5. A master server, comprising:
a memory configured for storing a computer program; and
a processor configured for implementing the method steps of claim 1 when executing the computer program stored in the memory.

6. A non-transitory computer-readable storage medium, having a computer program stored thereon which, when executed by a processor, causes the processor to perform method steps of claim 1.

7. A data storage method applicable to a control node, comprising:

sending a ready-to-split instruction for a to-be-split fragment to a master server for the to-be-split fragment, so that the master server sends the ready-to-split instruction to slave servers for the to-be-split fragment after receiving the ready-to-split instruction, and sends, when receiving data splitting points more than a first threshold number, the data splitting points to the control node; and when receiving the data splitting points, sending a splitting-storage instruction to the master server, so that the master server sends the splitting-storage instruction to each of the slave servers after receiving the splitting-storage instruction, and performs, when receiving first messages more than a second threshold number, performing splitting-storage on the to-be-split fragment according to the data splitting points to obtain target fragments.

8. The method according to claim 7, wherein, after the step of sending a splitting-storage instruction to the master server when receiving the data splitting points, the method further comprises:

after receiving the first message sent by the master server, determining data storage ranges of the target fragments and a target data storage range according to the data splitting points and a data storage range of the to-be-split fragment before the splitting-storage; and updating a pre-recorded data storage range of the to-be-split fragment to the target data storage range, and recording correspondence between target fragments and data storage range determined for the target fragments, wherein the target data storage range is a data storage range of the to-be-split fragment after the splitting-storage.

9. The method according to claim 7, further comprising:

sending, to servers, a gather instruction for data storage ranges of all fragments, so that after receiving the gather instruction, each of servers obtains data storage ranges of all fragments stored thereon, and sends obtained data storage ranges to the control node; wherein, the servers include the master server and the slave servers;

after receiving data storage ranges sent by the servers, determining, for each fragment, whether a pre-recorded state of the fragment is an in-splitting-storage state;

if pre-recorded state of the fragment is the in-splitting-storage state, determining whether a pre-recorded data storage range of the fragment is the same as the obtained data storage range of the fragment;

if the pre-recorded data storage range of the fragment is the same as the obtained data storage range, sending a splitting-storage instruction to the master server for the fragment; and if the pre-recorded data storage range of the fragment is not the same as the obtained data storage range, changing the pre-recorded state of the fragment to a splitting-storage completed state.

10. A control node, comprising:
a memory configured for storing a computer program; and
a processor configured for implementing the method steps of claim 7 when executing the computer program stored in the memory.

11. A non-transitory computer-readable storage medium, having a computer program stored thereon which, when executed by a processor, causes the processor to perform method steps of claim 7.

12. A data storage system, comprising a control node, a master server for a to-be-split fragment, and slave servers for a to-be-split fragment, wherein, the control node is configured for sending a ready-to-split instruction for the to-be-split fragment to the master server;

the master server is configured for sending the ready-to-split instruction to slave servers for the to-be-split fragment after receiving the ready-to-split instruction;

the slave severs are configured for obtains data splitting points of the to-be-split fragment after receiving the ready-to-split instruction, and sending the data splitting points to the master server;

the master server is further configured for sending, when the number of received data splitting points exceeds a first threshold number, data splitting points to the control node;

the control node is further configured for sending a splitting-storage instruction to the master server after receiving the data splitting points from the master server;

the master server is further configured for sending the splitting-storage instruction to each of the slave servers after receiving the splitting-storage instruction;

the slave severs are further configured for performing splitting-storage on the to-be-split fragment according to the data splitting points to obtain target fragments, and sending a first message to the master server to indicate completion of the splitting-storage; and the master server is further configured for performing, when the number of received first messages exceeds a second threshold number, splitting-storage on the to-be-split fragment according to the data splitting points to obtain target fragments.

* * * * *